US009822741B2

(12) United States Patent
Holzmann et al.

(10) Patent No.: US 9,822,741 B2
(45) Date of Patent: Nov. 21, 2017

(54) AIR INDUCTION SYSTEMS FOR INTERNAL COMBUSTION ENGINES

(71) Applicant: CUMMINS FILTRATION IP, INC., Columbus, OH (US)

(72) Inventors: Mark V. Holzmann, Stoughton, WI (US); Kenneth M. Tofsland, Stoughton, WI (US); Mark A. Terres, Shakopee, MN (US)

(73) Assignee: Cummins Filtration IP, Inc., Columbus, IN (US)

( * ) Notice: Subject to any disclaimer, the term of this patent is extended or adjusted under 35 U.S.C. 154(b) by 96 days.

(21) Appl. No.: 14/765,143

(22) PCT Filed: Jan. 21, 2014

(86) PCT No.: PCT/US2014/012275
§ 371 (c)(1),
(2) Date: Jul. 31, 2015

(87) PCT Pub. No.: WO2014/133686
PCT Pub. Date: Sep. 4, 2014

(65) Prior Publication Data

US 2016/0003201 A1 Jan. 7, 2016

Related U.S. Application Data

(60) Provisional application No. 61/770,425, filed on Feb. 28, 2013.

(51) Int. Cl.
*F16L 37/10* (2006.01)
*F02M 35/10* (2006.01)
(Continued)

(52) U.S. Cl.
CPC ...... *F02M 35/10137* (2013.01); *F02M 35/02* (2013.01); *F02M 35/048* (2013.01);
(Continued)

(58) Field of Classification Search
CPC ....... F02M 35/10137; F02M 35/10242; F02M 35/10065; F02M 35/02; F02M 35/161; F02M 35/048; F02M 35/10013
(Continued)

(56) References Cited

U.S. PATENT DOCUMENTS 2,878,012 A 3/1959 Crites
2,922,663 A 1/1960 Wolf
(Continued)

FOREIGN PATENT DOCUMENTS

EP 0 135 531 4/1985
EP 0 342 543 11/1989
(Continued)

OTHER PUBLICATIONS

International search Report and Written Opinion for PCT/US2014/012275, dated May 9, 2014, 16 pages.

*Primary Examiner* — Marguerite McMahon
(74) *Attorney, Agent, or Firm* — Foley & Lardner LLP

(57) ABSTRACT

Air induction systems are for an internal combustion engine. The air induction systems comprise an air intake plenum that conducts intake airflow to an air cleaner for cleaning prior to combustion in the internal combustion engine. The air intake plenum is movable with respect to the air cleaner between an open position separated from the air cleaner and a closed position connected to the air cleaner. A bellows connects the air intake plenum to the air cleaner when the air intake plenum is in the closed position. The bellows has an upstream first end that seals with the air intake plenum and a downstream second end that seals with the air cleaner.

41 Claims, 9 Drawing Sheets

(51) Int. Cl.
*F02M 35/16* (2006.01)
*F02M 35/04* (2006.01)
*F02M 35/02* (2006.01)

(52) U.S. Cl.
CPC ................. *F02M 35/10013* (2013.01); *F02M 35/10065* (2013.01); *F02M 35/10242* (2013.01); *F02M 35/161* (2013.01)

(58) Field of Classification Search
USPC .......................................................... 180/68.3
See application file for complete search history.

(56) References Cited

U.S. PATENT DOCUMENTS

| | | | | |
|---|---|---|---|---|
| 2,952,327 | A | | 9/1960 | Farr |
| 3,017,944 | A | | 1/1962 | Norrie |
| 3,151,695 | A | | 10/1964 | Mintz |
| 3,249,172 | A | | 5/1966 | De Lorean |
| 3,791,112 | A | | 2/1974 | Lidstone |
| 4,095,808 | A | | 6/1978 | Glasson |
| 4,275,889 | A | | 6/1981 | Butler et al. |
| 4,378,945 | A | | 4/1983 | Trautman |
| 4,633,213 | A | * | 12/1986 | Venema ................... G01K 5/42 200/83 C |
| 4,877,048 | A | * | 10/1989 | Oltean .................. B60C 23/003 137/225 |
| 4,974,881 | A | | 12/1990 | Engel et al. |
| 5,129,685 | A | | 7/1992 | Engel |
| 2002/0079154 | A1 | | 6/2002 | Gloaguen |
| 2007/0113529 | A1 | | 5/2007 | Gierer |
| 2008/0242213 | A1 | | 10/2008 | Mayer et al. |

FOREIGN PATENT DOCUMENTS

| | | |
|---|---|---|
| EP | 0 411 030 | 2/1991 |
| EP | 0 736 697 | 10/1996 |
| KR | 10-0715897 | 11/2006 |
| WO | WO-89/10476 | 11/1989 |
| WO | WO-2009/045708 | 4/2009 |

* cited by examiner

AIR INDUCTION SYSTEMS FOR INTERNAL COMBUSTION ENGINES

CROSS REFERENCE TO RELATED APPLICATIONS

The present application is a National Stage of PCT Application No. PCT/US2014/012275, filed Jan. 21, 2014, which claims the benefit of and priority to U.S. Provisional Patent Application No. 61/770,425 filed Feb. 28, 2013. These applications are incorporated herein by reference in their entirety.

FIELD

The present application relates to air induction systems for internal combustion systems.

BACKGROUND

U.S. Pat. No. 4,378,945 discloses a bellows-type spring seal having a flexible bellows with an upper sealing end adapted to mate with a bell housing of an air intake pipe. The seal provides an effective breakaway joint when the cab is tilted forward from over the engine. A means, such as coil springs, encircles the bellows to push upon the underside of the sealing end of the bellows to provide a positive preload sealing force. The seal is self-aligning in the vertical and horizontal planes to accommodate cab rocking and minor misalignment in manufacture of the truck.

U.S. Pat. No. 4,974,881 discloses an air flow conduit system for air flow communication between an air filter mechanism and an engine intake manifold. The conduit system comprises first, second and third substantially rigid conduit members. Engagement between conduit members is provided by a rib system on a narrow end of a conduit member being received within a broad end of a next adjacent conduit member. Sealing engagement occurs by an elastomeric seal member positioned between the ribs and an end of a conduit member within which the ribs are received. A preferred rib arrangement is provided, to insure a flexible, multi-point, seal system.

U.S. Pat. No. 5,129,685 discloses an air flow conduit system for air flow communication between an air filter mechanism and an engine intake manifold. The conduit system comprises substantially rigid straight conduit members joined in fluid communication by connector systems having elbow-shaped conduit members. A narrow end of a conduit member is received within a broad end of a next adjacent conduit member. Sealing engagement occurs via an elastomeric seal member having ribs thereon positioned radially between the inner and outer conduits. A preferred rib arrangement is provided, to insure a flexible, multi-point, seal system.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

Air induction systems are provided for an internal combustion engine. In certain examples, the air induction system comprises an air intake plenum that conducts intake airflow to an air cleaner for cleaning prior to combustion in the internal combustion engine. The air intake plenum is movable with respect to the air cleaner between an open position separated from the air cleaner and a closed position connected to the air cleaner. A bellows connects the air intake plenum to the air cleaner when the air intake plenum is in the closed position. The bellows has an upstream first end that seals with the air intake plenum and a downstream second end that seals with the air cleaner. A spring is disposed in the bellows. The spring applies a biasing pressure on the bellows that encourages sealing between the bellows and at least one of the air intake plenum and the air cleaner when the air intake plenum is in the closed position. A shield blocks inflow of rain water to the bellows when the air intake plenum is in the open position.

BRIEF DESCRIPTION OF THE DRAWINGS

Examples of air induction systems for internal combustion systems are described with reference to the following Figures. The same numbers are used throughout the Figures to reference like features and like components.

DETAILED DESCRIPTION OF THE DRAWINGS

Through research and development, the present inventors have endeavored to provide long-term flexible and durable sealing joints between air intake plenums and an air cleaners providing combustion air to internal combustion engines. In such applications, the present inventors have found it desirable to control intake air temperature rises to within 5° F. The present inventors have also found it desirable to prevent environmental elements such as rain, snow, dust, etc. from entering the sealing joint and interfering with operation of the air cleaner.

Figure 1:
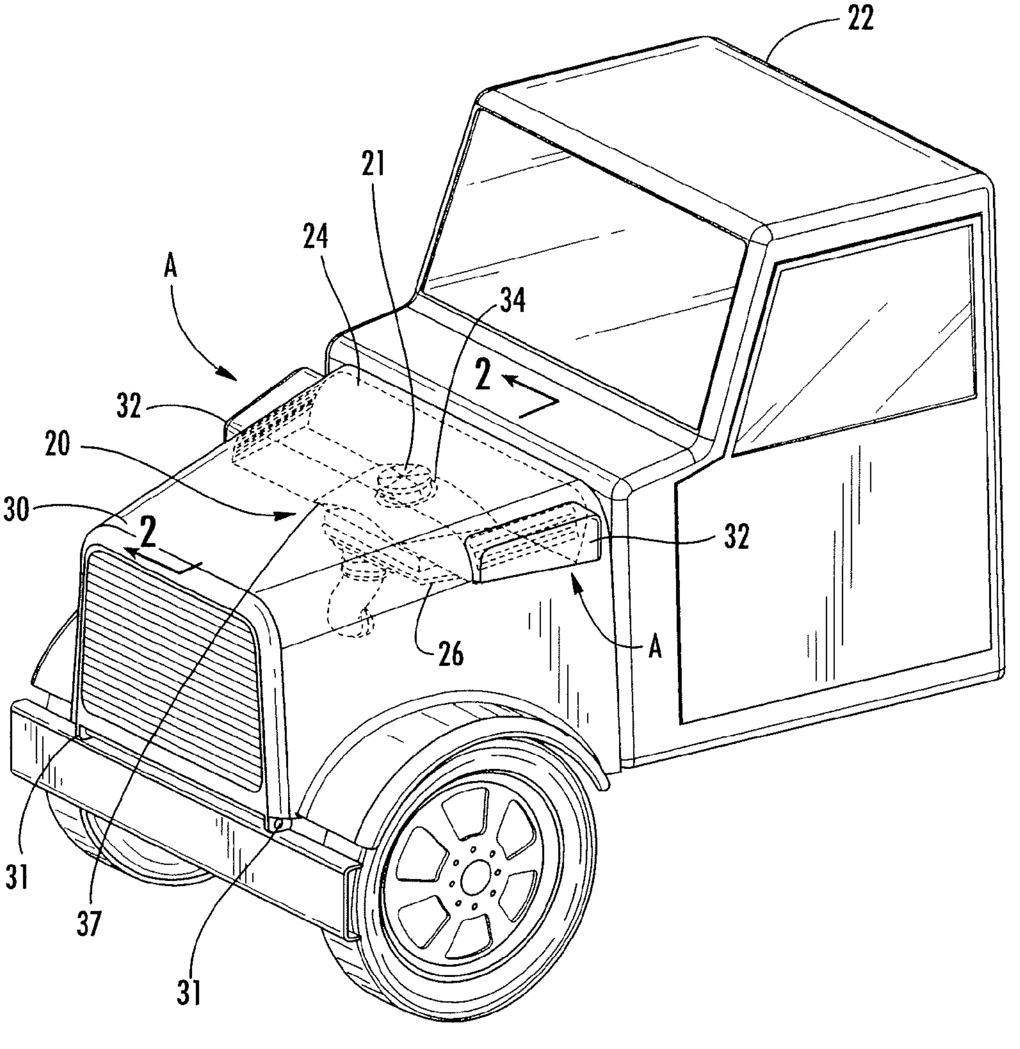
FIG. 1 is a perspective view of a vehicle having a hood with an air intake plenum providing intake airflow to an air cleaner for cleaning prior to combustion in the internal combustion engine.
Figure 2:
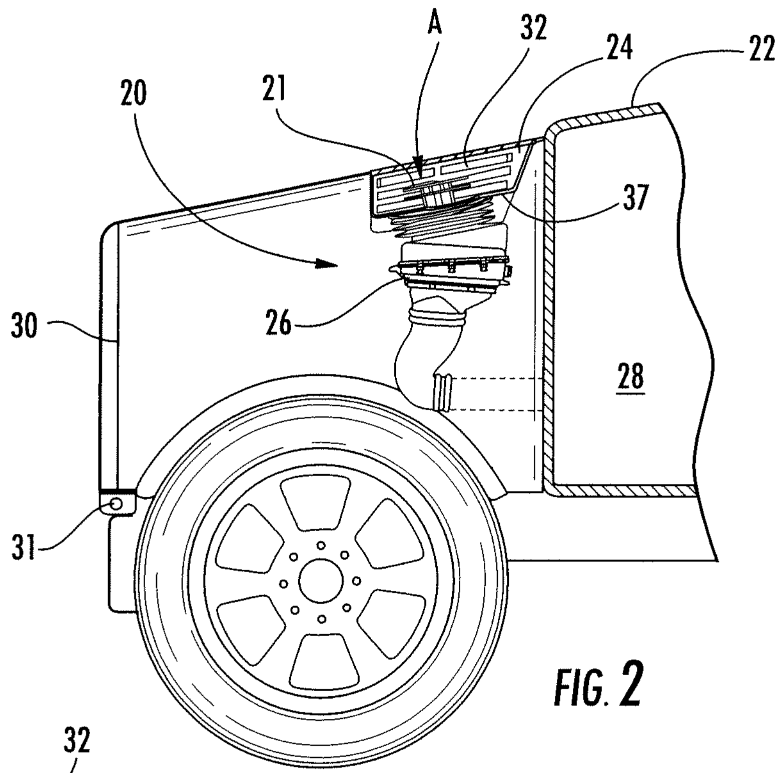
FIG. 2 is a side view of the vehicle showing the hood and its air intake plenum in a closed position wherein intake airflow is directed to the air cleaner.
Figure 3:
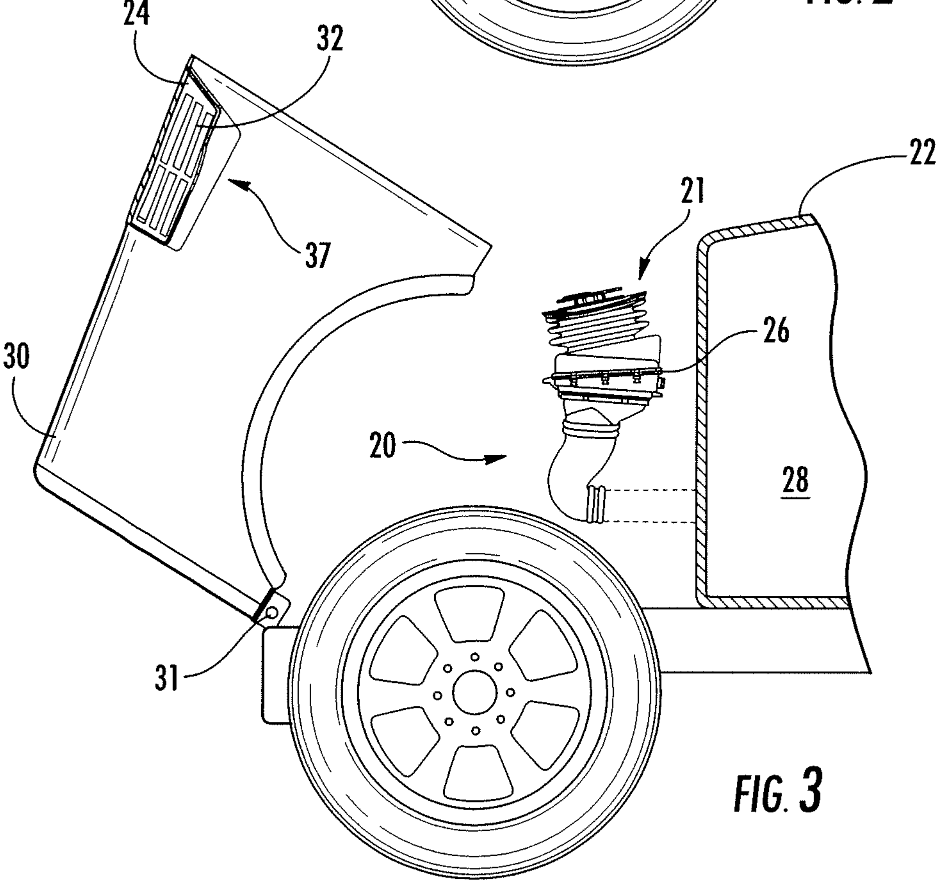
FIG. 3 is a side view of the vehicle showing the hood and its air intake plenum in an open position wherein the air intake plenum is separated from the air cleaner.

FIGS. 1-3 depict an air induction system 20 for a vehicle 22. In this example, the air induction system 20 is adapted for use with a truck; however the air induction system 20 of the present disclosure can be adapted for use with a variety of different vehicles, including other types of on- and off-road trucks, cars, and/or the like. The air induction system 20 includes an air intake plenum 24 and an air cleaner 26 for cleaning the intake air prior to combustion in an internal combustion engine, shown schematically at 28. The air cleaner 26 is a conventional intake air filter having a housing and filter media for filtering particular matter and/or other contaminants from the intake air; however this example is not limiting. The air induction system 20 of the present disclosure can be adapted for use with any conventional device for cleaning intake air.

As shown by arrows A, the air intake plenum 24 conducts intake airflow from the atmosphere surrounding the vehicle 22 to the air cleaner 26, which resides under the hood 30 of the vehicle 22. The air intake plenum 24 is formed under the hood 30 of the vehicle 22 and receives intake airflow via opposing inlets 32 on the hood 30. In this example, the air intake plenum 24 is formed with or attached to the hood 30; however other locations for the air intake plenum 24 are contemplated. Intake airflow travels from the opposing intake inlets 32 to a central opening 34 in a lower surface 37 of the air intake plenum 24. The exact configuration of the air intake plenum 24 can vary from that which is shown.

As shown in FIGS. 2 and 3, the hood 30 and the associated air intake plenum 24 are together movable between a closed position shown in FIG. 2 and an open position shown in FIG. 3. The hood 30 is pivotable about a hinge 31 located at the front of the vehicle 22; however other types of movable connections between the hood 30 and the vehicle 22 can and often are employed. The hood 30 typically is moved into the open position during periods of non-use and sometimes during start-up of the vehicle 22. The hood 30 typically is in the closed position during travel of the vehicle 22.

According to the present disclosure, the air induction system 20 includes a device 21 for connecting the air from the air intake plenum 24 to the air cleaner 26 in a manner that provides a long-term sealing joint and/or protects the air cleaner 26 from intrusion of environmental elements such as water and/or dust. The particular configuration of the device 21 can vary, examples of which are shown in FIGS. 2-7, 8-11, 12, and 13.

FIGS. 2-7 depict an example of a device 21A having a bellows 36 that connects the air intake plenum 24 to the air cleaner 26 when the air intake plenum 24 is in the closed position. The bellows 36 is made of a resilient flexible material, such as rubber and/or the like, wherein under pressure the bellows 36 can be compressed into a compressed position and then will expand back under power of its own resiliency towards an expanded position when the pressure is released. The bellows 36 is axially elongated and has an upstream first end 38 that is configured to seal with the air intake plenum 24 and a downstream second end 40 that seals with the air cleaner 26. More specifically, the bellows 36 has an upper mating surface 42 that sealingly abuts against a lower mating surface 37 of the air intake plenum 24 when the hood 30 of the vehicle 22 is moved into the closed position. When the hood 30 is moved into the open position, the lower mating surface 37 of the air intake plenum 24 and mating surface 42 of the bellows 36 are separated, thereby opening the seal. The shape and construction of the mating surfaces 37 and 42 can vary from that which is shown as long as an effective seal is created between the bellows 36 and the air intake plenum 24 when the hood 30 is moved into the closed position. In this example, the mating surface 42 is relatively flat and square-shaped, and has a plurality of perimeteral sealing ribs 44 for encouraging the noted sealing contact between the mating surfaces 42 and 37.

The bellows 36 has a plurality of corrugations 46 along its length. An axially lowermost corrugation 46 is received in a mating channel 48 of a static base member 50 connected in sealing relationship with an inlet opening of the air cleaner 26. Thus, the downstream second end 40 of the bellows 36 is sealed with the air cleaner 26. The manner of connection between the bellows 36 and air cleaner 26 can vary from that shown and described as long as a seal is provided therebetween. A spring 52 is disposed in the bellows 36 and applies a biasing pressure on the bellows 36 that encourages sealing between the bellows 36 and the air intake plenum 24 and between the bellows 36 and the air cleaner 26. The spring 52 has convolutions 54 that optionally can be interdigitated amongst the plurality of corrugations 46. The spring 52 has opposite first and second ends 56, 58. The first end 56 is engaged in a groove 60 on an internal surface 62 of one of corrugations 46 of the bellows 36. The opposite second end 58 abuts against an outer surface of the mating channel 48 on the base member 50. The manner of connection between the spring 52 and bellows 36 can vary from that shown as long as the spring 52 effectively applies a bias force on the bellows 36.

In some other examples, the orientation of the bellows 36 could be the opposite from that shown, such that the first end 38 of the bellows 36 remains connected to the air intake plenum 24 when the hood 30 is moved into the open position. In these examples the second end 40 of the bellows 36 can have a mating surface for mating with a compatible mating surface on the air cleaner 26. In some examples, the orientation of the spring 52 could also be reversed, such that the first end 56 of the spring 52 abuts against an outer surface of a mating channel on a base member associated with the air intake plenum 24 and the second end 58 of the spring 52 is engaged in a groove 60 on an internal surface of one of corrugations of the bellows 36. In some other examples, both of the first and second ends 56, 58 of the spring 52 can be engaged in grooves on internal surfaces of corrugations of the bellows 36.

Figure 5:
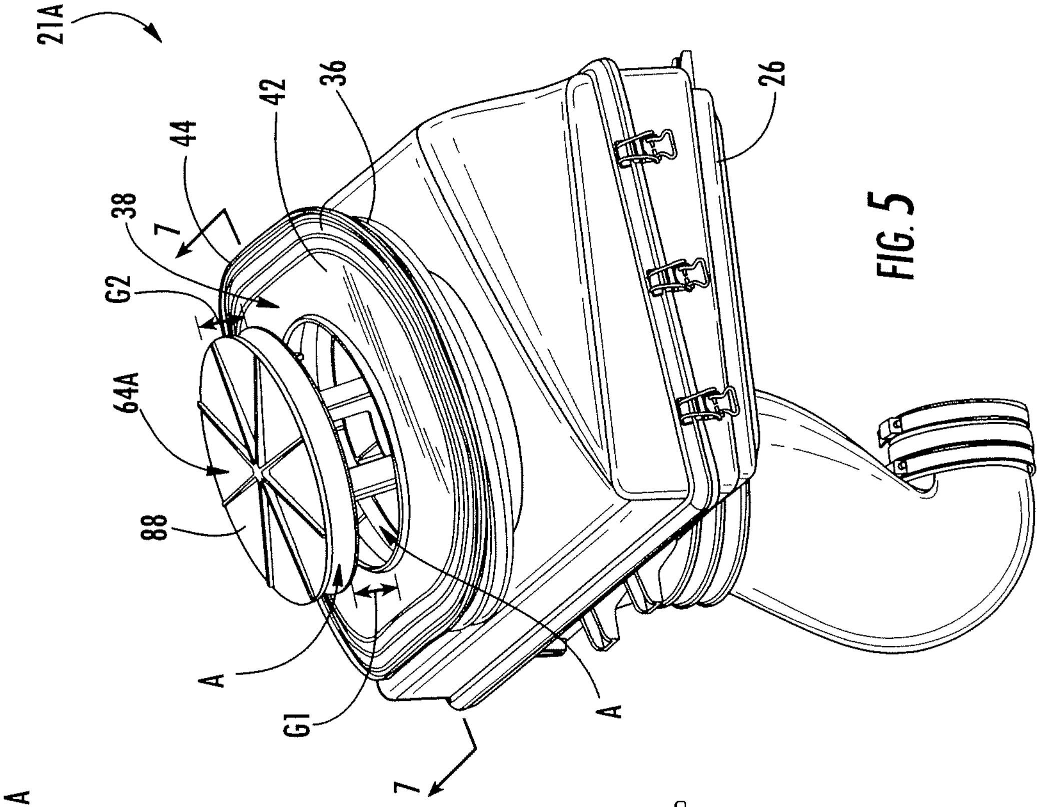
FIG. 5 is another perspective view of the device of FIG. 4, when the hood and air intake plenum are in a closed position.
Figure 4:
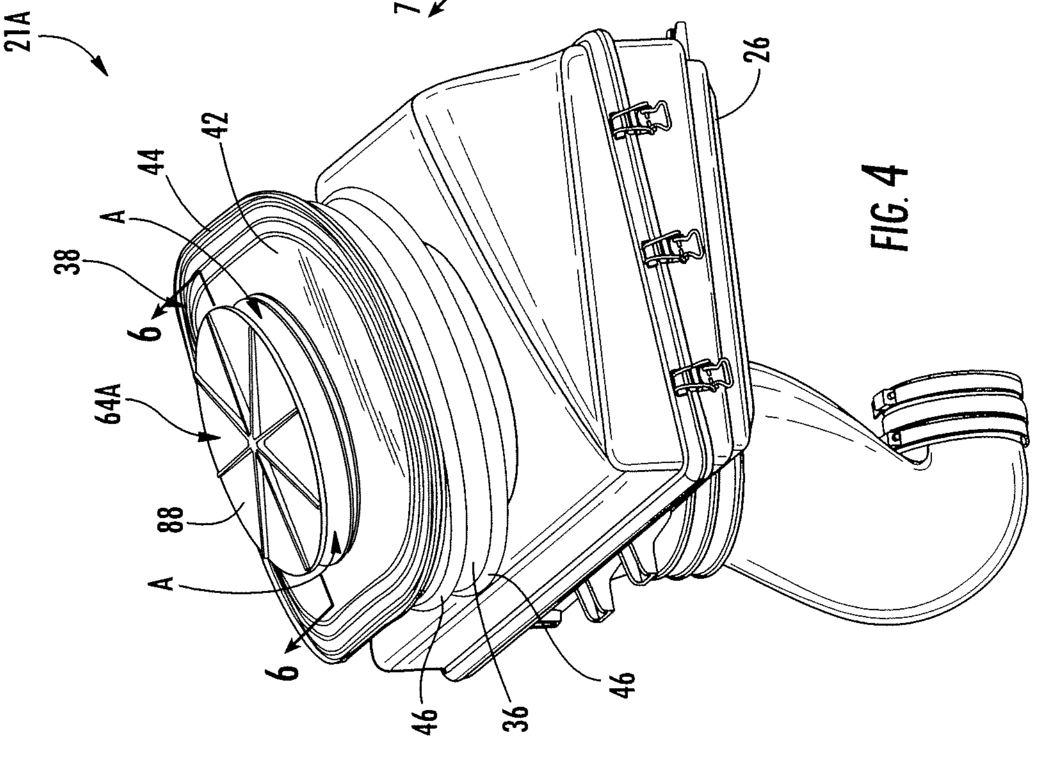
FIG. 4 is a perspective view of a device for connecting the air intake plenum to the air cleaner.
Figure 6:
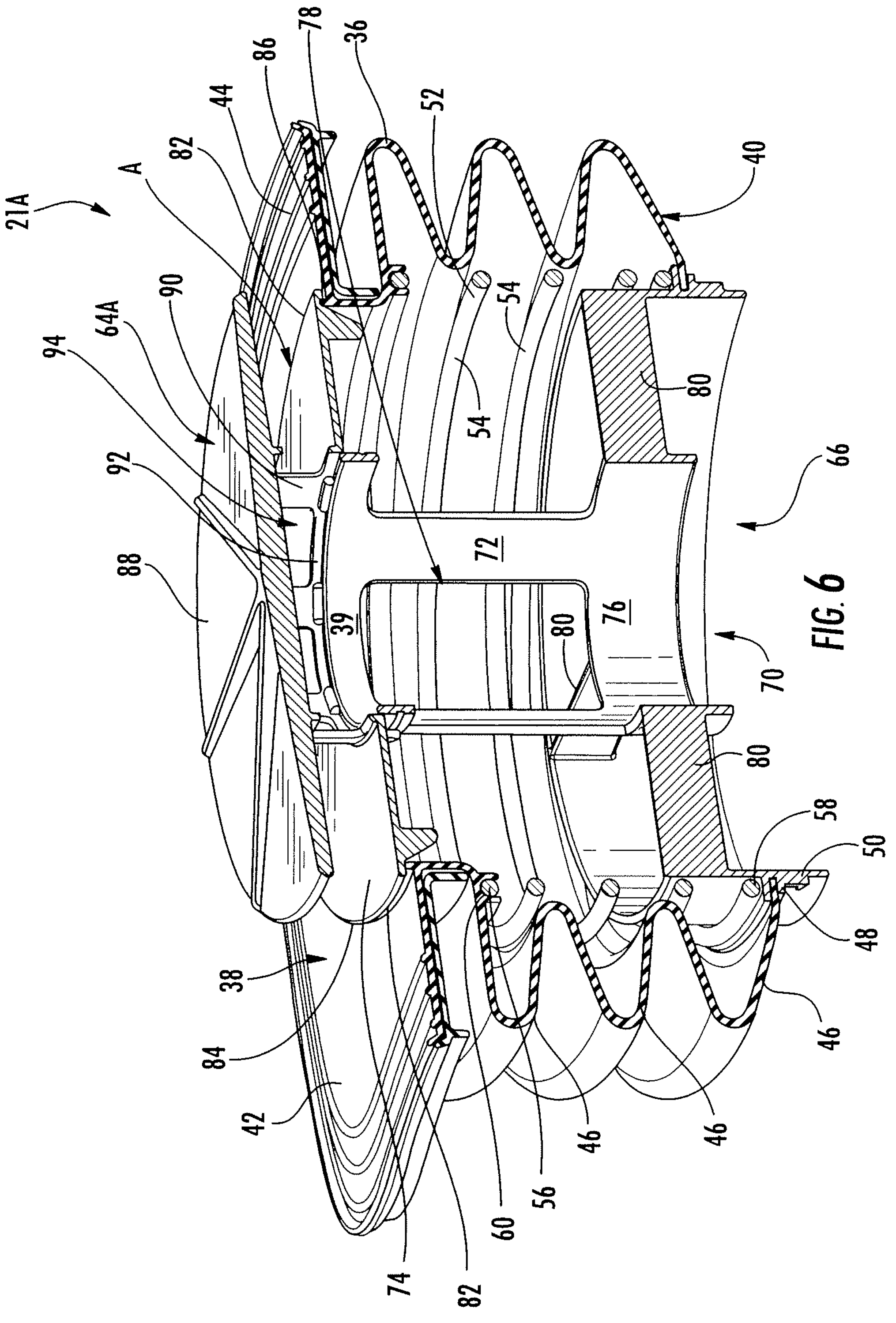
FIG. 6 is a view of section 6-6 taken in FIG. 4.
Figure 7:
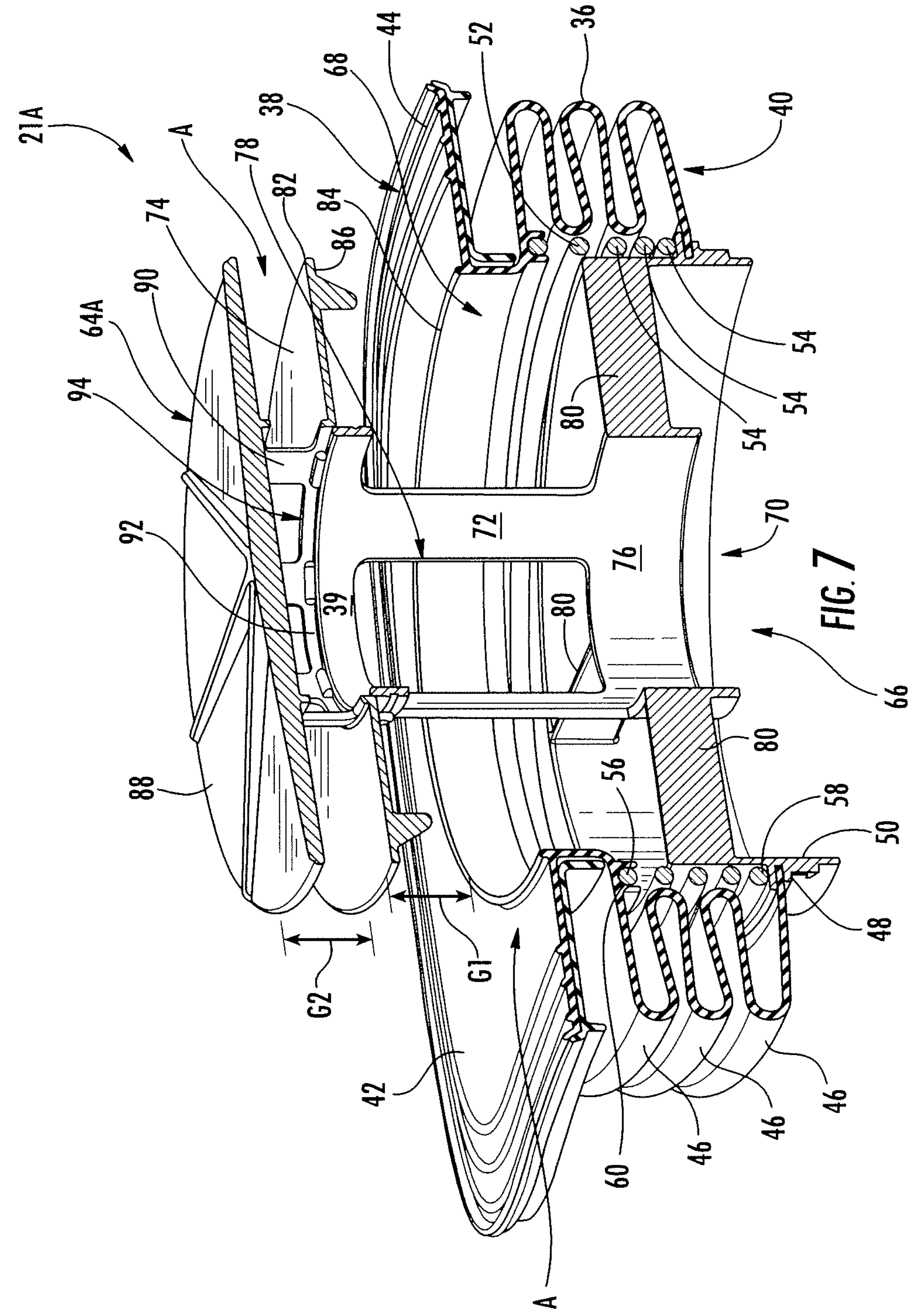
FIG. 7 is a view of section 7-7, taken in FIG. 5.

FIGS. 2, 5 and 7 depict the situation where the hood 30 and its air intake plenum 24 are in the noted closed position. FIGS. 3, 4 and 6 depict the situation where the hood 30 and its air intake plenum 24 are in the noted open position. As shown by comparison of these figures, the spring 52 and bellows 36 are axially compressed when the hood 30 and air intake plenum 24 are in the noted closed position. The spring 52 and bellows 36 are not axially compressed, or are extended, when the hood 30 and the air intake plenum 24 are in the noted open position. The natural resiliency of the bellows 36 and the resiliency or spring force of the spring 52 both operate to bias the bellows 36 into the extended position shown in FIGS. 3, 4 and 6 when the hood 30 is moved into the open position. Engagement between the lower mating surface 37 of the air intake plenum 24 and the mating surface 42 of the bellows 36, including downward movement of the hood 30 into the position shown in FIG. 2, compresses the bellows 36 into the compressed state shown in FIGS. 2, 5 and 7. In the closed position, the combined biasing forces of the spring 52 and the natural resiliency of the bellows 36 operates to maintain effective sealing pressure over time, even when the resiliency of the bellows 36 itself does not provide an effective seal. Therefore rise of atmospheric air intake temperature can be better controlled.

The device 21A shown in FIGS. 2-7 also has a shield 64A that at least partially covers the upstream first end 38 of the bellows 36, thereby limiting intrusion of environmental elements to the air cleaner 26. The shield 64A covers the upstream first end 38 to a greater degree when the hood 30 and air intake plenum 24 are in the open position, shown in FIG. 3, than when the hood 30 and air intake plenum 24 are in the closed position, shown in FIG. 2. That is, the shield 64A is configured such that a first axial, perimeteral cross-sectional area for intake airflow through the bellows 36 is defined when the bellows 36 is compressed into the compressed state shown in FIGS. 5 and 7 and a smaller, second axial, perimeteral cross-sectional area for intake airflow through the bellows 36 is defined when the bellows 36 is in the extended state shown in FIGS. 4 and 6. Thus the shield 64A is configured to block inflow of environmental elements, such as rain water, into the bellows 36 when the hood 30 and air intake plenum 24 are in the open position shown in FIG. 3. The shield 64A is also configured to block inflow of environmental elements such as rain water to the bellows 36 when the hood 30 and air intake plenum 24 are in the closed position. However the shield 64A blocks inflow of environmental elements such as rain water to the bellows 36 to a greater degree when the hood 30 and air intake plenum 24 are in the open position then when the hood 30 and air intake plenum 24 are in the closed position.

In this example, the shield 64A is fixed to the inlet on the air cleaner 26 and remains stationary with respect to the air intake plenum 24 and hood 30 as the air intake plenum 24 and hood 30 move between the open and closed positions. As noted hereinabove, the bellows 36 is forced into the compressed state shown in FIG. 7 when the air intake plenum 24 is in the closed position and the bellows 36 is biased into an extended state shown in FIG. 6 when the air intake plenum 24 is in the open position. As shown in FIG. 7, the bellows 36 is elongated and defines an interior channel 66 that extends between an upstream first opening 68 at the upstream first end 38 and a downstream second opening 70 at the downstream second end 40. As shown in FIGS. 6 and 7, the shield 64A includes an axial support member 72 that axially extends along the interior channel 66. A radial cover plate 74 radially extends from the axial support member 72. The configuration of the axial support member 72 can vary from that which is shown. In this example, the axial support member 72 includes a center post 76 that has a plurality of throughholes 78 that allow intake of airflow therethrough from upstream to downstream. A plurality of radially extending ribs 80 support the center post 76 in the interior channel 66. The radial cover plate 74 has a radially outer edge 82 that is located adjacent an inner perimeteral surface 84 of the bellows 36 when the air intake plenum 24 is in the noted open position, see FIGS. 3 and 6, thereby reducing or eliminating inflow of environmental elements such as rain water through the bellows 36.

In the example shown in FIGS. 2-7, the radially outer edge 82 has a bottom portion 86 that seals with the bellows 36 when the hood 30 and air intake plenum 24 are in the open position, shown in FIGS. 3 and 6. The radially outer edge 82 of the cover plate 74 is axially spaced apart from the first end 38 of the bellows 36 when the air intake plenum 24 is in the closed position so as to define a first perimeteral gap G1 shown in FIGS. 5 and 7 through which intake airflow passes to the air cleaner 26. As explained further herein below, the gap G1 also exists in the embodiment shown in FIGS. 8 and 9. A radial extension plate 88 is axially spaced apart from the radial cover plate 74 so as to define a second perimeteral gap G2 therebetween that is axially spaced apart from the first perimeteral gap G1 through which intake airflow passes to the air cleaner 26. The second perimeteral gap G2 continuously allows intake airflow to pass into the bellows 36 via a hole 39 in the cover plate 74, when the air intake plenum 24 is moved between the open and closed positions. The size of the shield 64A can be selected so that the gap G2 is big enough to allow sufficient airflow during idle conditions of the engine 28 and the combined gaps G1 and G2 are big enough to allow maximum speed operation of engine 28. An extension member 90 supports the radial extension plate 88 apart from the radial cover plate 74. The extension member 90 includes a center post 92 that has a plurality of throughholes 94 that allow intake airflow into the interior channel 66.

Figure 8:
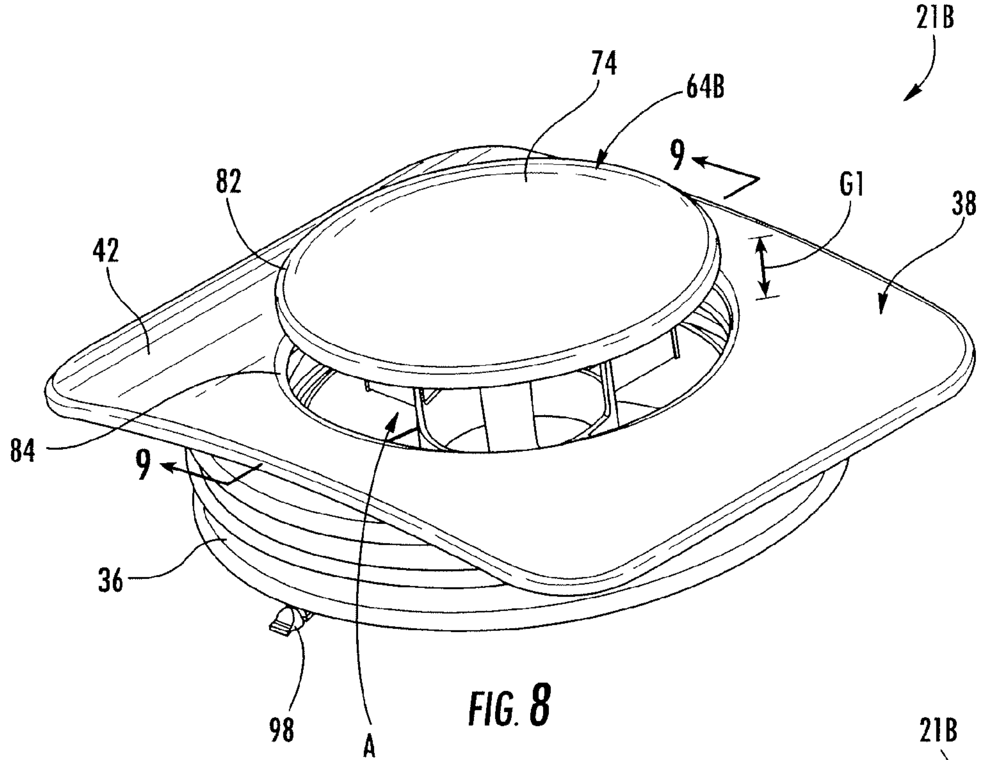
FIG. 8 is a perspective view of another example of a device for connecting the air intake plenum to the air cleaner when the hood is in the closed position.
Figure 9:
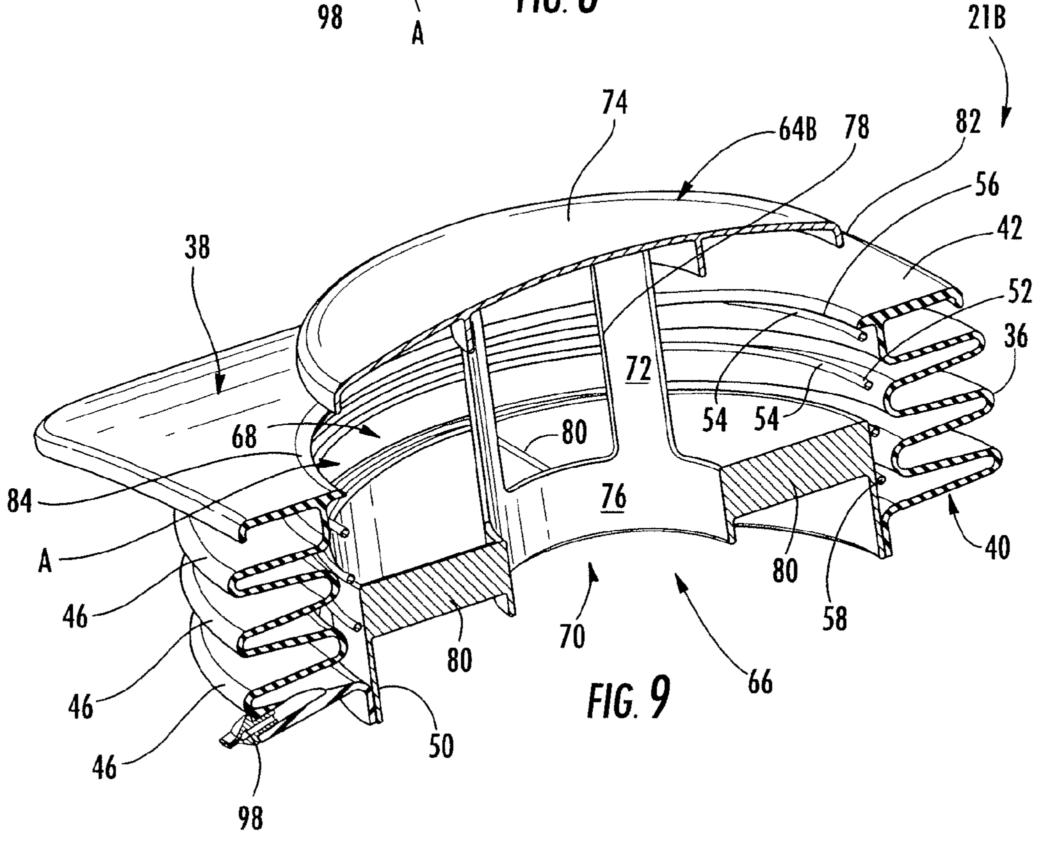
FIG. 9 is view of section 9-9, taken in FIG. 8.
Figure 10:
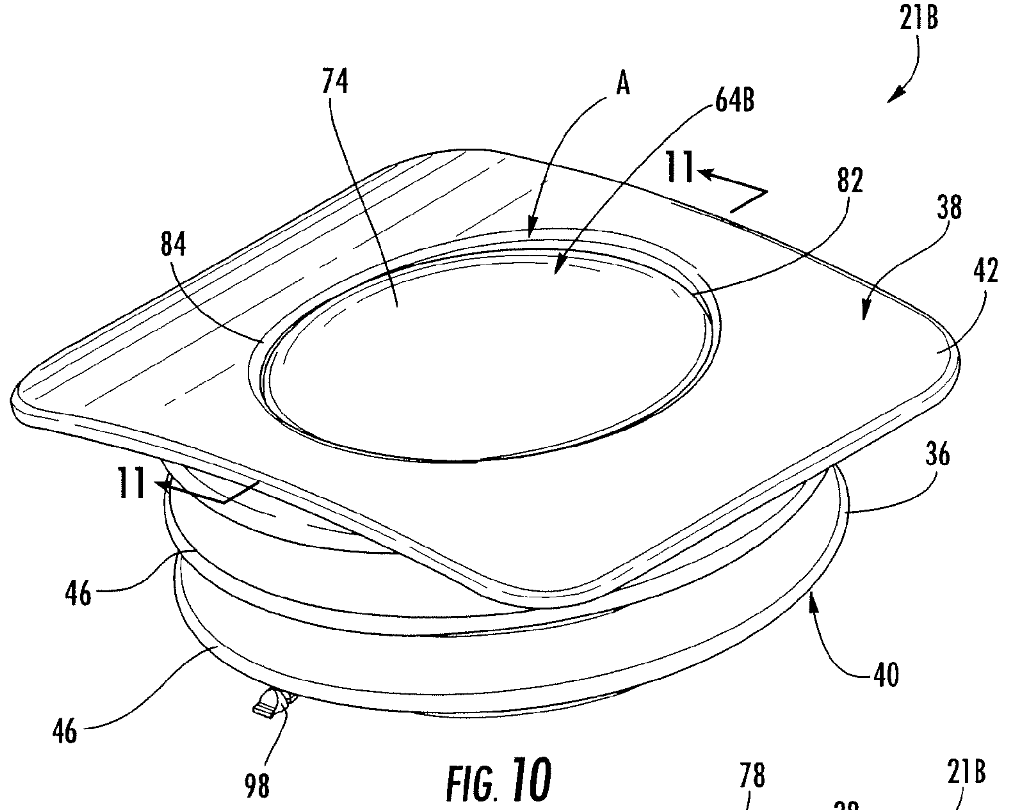
FIG. 10 is a perspective view of the device of FIG. 8, when the air intake plenum is in the open position.
Figure 11:
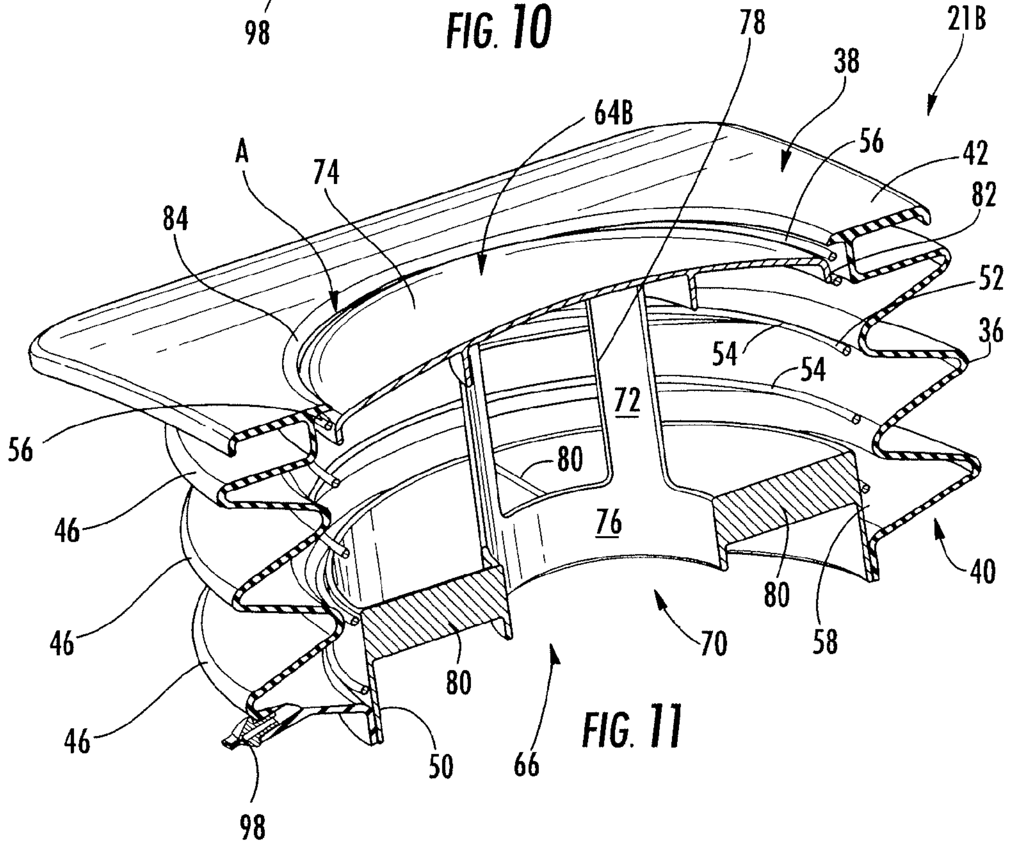
FIG. 11 is a view of section 11-11, taken in FIG. 10.

FIGS. 8-11 depict another example of a device 21B for connecting the air intake plenum 24 to the air cleaner 26. FIGS. 8 and 9 show the device 21B when the hood 30 and air intake plenum 24 are in the closed position. FIGS. 9 and 10 show the device 21B when the hood 30 and air intake plenum 24 are in the open position. In this example, the bellows 36 and spring 52 are configured similar to the examples shown in FIGS. 1-7. The shield 64B has a different configuration from the shield 64A shown in FIGS. 1-7. In this example, the shield 64B does not include the radial extension plate 88 and extension member 90. Also, the cover plate 74 does not include the noted hole 39. The radial cover plate 74 has the noted radially outer edge 82 which, as shown in FIGS. 10 and 11, is located adjacent to the inner perimeteral surface 84 of the bellows 36 when the air intake plenum 24 is in the open position. In this example, the radially outer edge 82 is axially flush with the first opening 68 at the first end 38 of the bellows 36 when the air intake plenum 24 is in the open position. The radially outer edge 82 is axially spaced apart from the first end 38 of the bellows 36 when the air intake plenum 24 is in the closed position, as shown in FIGS. 8 and 9, so as to axially define a first perimeteral gap G1 through which the intake airflow passes to the air cleaner 26. A drain valve 98 is provided in the bellows 36. The drain valve 98 is a conventional one-way valve formed in one of the plurality of corrugations 46 and drains rainwater that enters the bellows 36. The drain valve 98 can be necessary in examples where the radially outer edge 82 of the radial cover plate 74 does not seal with the inner perimeteral surface 84 of the bellows 36, thus draining environmental elements, such as rainwater, that passes into the interior channel 66 of the bellows 36 between the radial outer edge 82 and the inner perimeteral surface 84. The location of the drain valve 98 can vary from that shown. For example the drain valve 98 can instead be located in base member 50.

Figure 12:
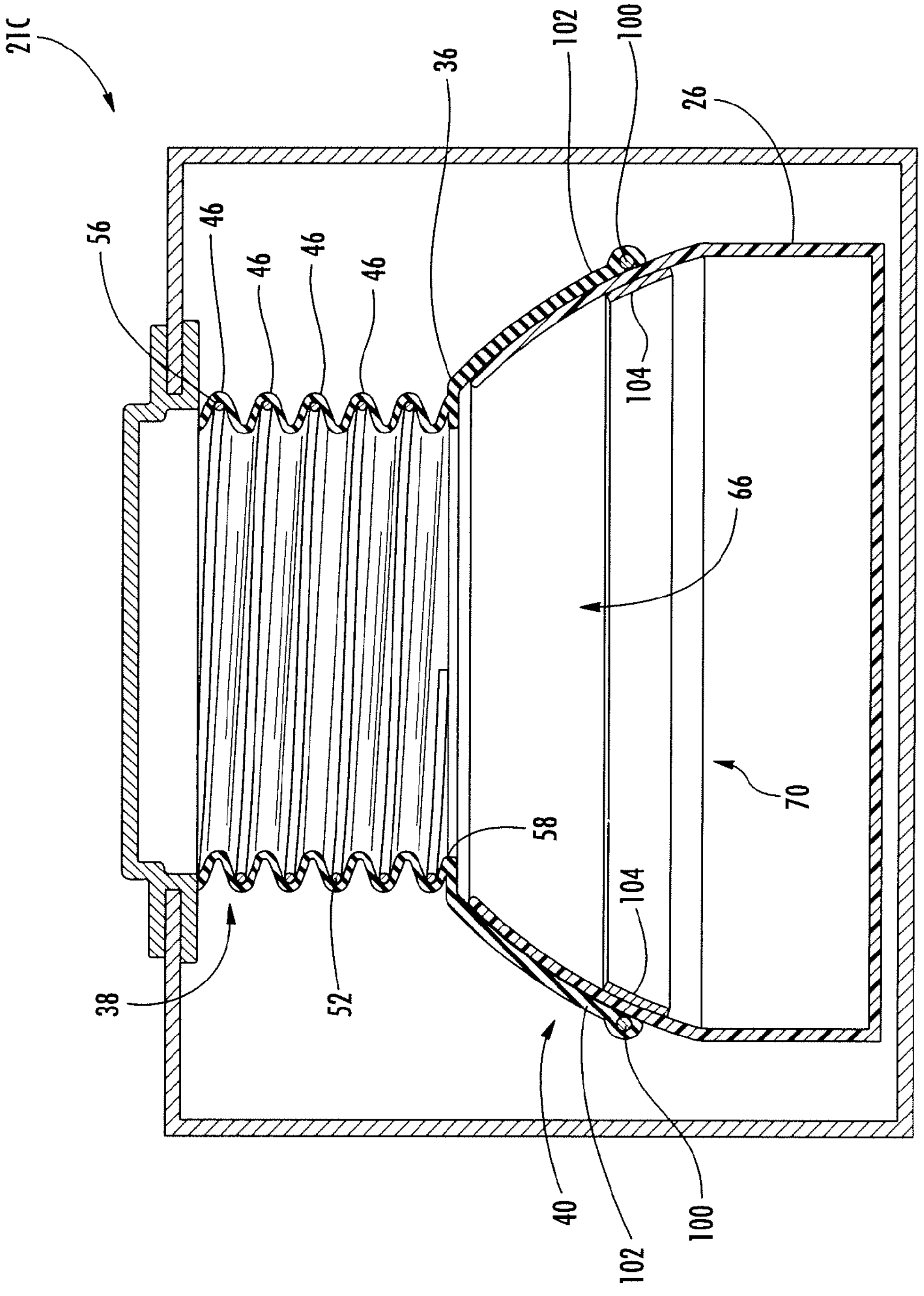
FIG. 12 is a section view of another example of a device that connects the air intake plenum to the air cleaner.

FIG. 12 depicts another example of a device 21C for connecting the air intake plenum 24 to the air cleaner 26 when the air intake plenum 24 is in the closed position. In this example, a magnet 100 is provided on the outer perimeter 102 of the bellows 36. The type of magnet can vary and could be a permanent magnet or an electromagnet. A metal ring 104 is disposed in the air cleaner 26. The magnet 100 is attracted to the metal ring 104 and thereby creates a perimeter seal between the bellows 36 and the air cleaner 26. In another example, the bellows 36 and air cleaner 26 can comprise a North and South magnet so that the bellows 36 and air cleaner 26 are magnetically attracted to each other, thereby forming a perimeteral seal therebetween.

Figure 13:
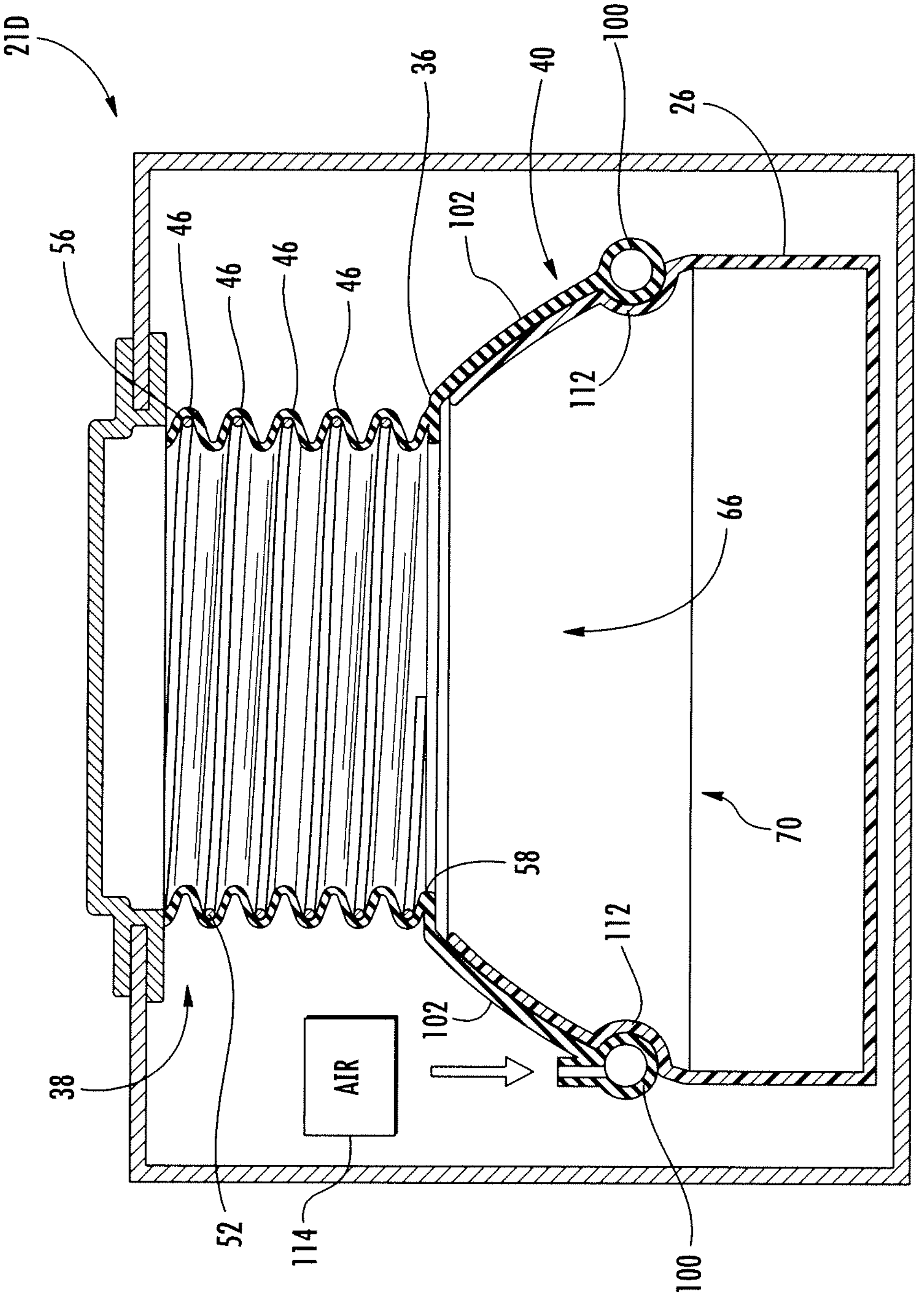
FIG. 13 is a section view of yet another example of a device that connects the air intake plenum to the air cleaner.

FIG. 13 depicts another example of a device 21D for connecting the air intake plenum 24 to the air cleaner 26 when the air intake plenum 24 is in the closed position. A pressurized inflatable ring 110 is disposed in a perimeteral groove 112 on the outer perimeter 102 of the bellows 36. Inflation of the ring 110 via a source of pressurized air 114 expands the inflatable ring 110 and thus presses radially inwardly into the perimeteral groove 112 onto the outer perimeter 102 of the bellows 36, thus pressing the outer perimeter 102 of the bellows 36 against the groove 112 in the housing 114 of the air cleaner 26, thus creating a perimeteral seal between the bellows 36 and the air cleaner 26. The type of source of pressurized air 114 can vary and can include, for example a pump.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims. Each limitation in the appended claims is intended to invoke interpretation under 35 USC §112, sixth paragraph, only if the terms “means for” or “step for” are explicitly recited in the respective limitation.

What is claimed is:

1. An air induction system for an internal combustion engine, the air induction system comprising:

an air intake plenum that conducts intake airflow to an air cleaner for cleaning prior to combustion in the internal combustion engine, wherein the air intake plenum is movable with respect to the air cleaner between an open position separated from the air cleaner and a closed position connected to the air cleaner;

a bellows that connects the air intake plenum to the air cleaner when the air intake plenum is in the closed position, the bellows having an upstream first end that seals with the air intake plenum and a downstream second end that seals with the air cleaner; and a spring disposed in the bellows, wherein the spring applies a biasing pressure on the bellows that encourages sealing between the bellows and at least one of the air intake plenum and the air cleaner when the air intake plenum is in the closed position;

wherein when the air intake plenum is in the closed position, the bellows is compressed into a compressed state and when the air intake plenum is in the open position, the bellows is biased by the spring into an extended state; and wherein in a first cross sectional area for intake airflow through the bellows is defined in the compressed state, and a smaller, second cross sectional area for intake airflow through the bellows is defined in the extended state.

2. The air induction system according to claim 1, wherein the spring and the bellows are compressed when the air intake plenum is in the closed position and wherein the spring and the bellows are not compressed when the air intake plenum is in the open position.

3. The air induction system according to claim 1, wherein the bellows has a top mating surface that receives and seals with the air intake plenum when the air intake plenum is in the closed position.

4. The air induction system according to claim 1, wherein the bellows comprises a plurality of corrugations and wherein the spring comprises convolutions that are interdigitated amongst the plurality of corrugations.

5. The air induction system according to claim 1, comprising a shield that blocks inflow of rain water to the bellows when the air intake plenum is in the open position.

6. The air induction system according to claim 1, comprising a pressurized inflatable ring on an outer perimeter of the bellows, wherein inflation of the pressurized inflatable ring creates a perimeter seal between the bellows and the air cleaner.

7. The air induction system according to claim 6, wherein the pressurized inflatable ring is disposed in a perimeteral groove on the outer perimeter of the bellows.

8. The air induction system according to claim 1, comprising a magnet on an outer perimeter of the bellows and a metal ring disposed in the air cleaner, wherein the magnet is attracted to the metal ring and thereby creates a perimeteral seal between the bellows and the air cleaner.

9. The air induction system according to claim 1, wherein the bellows and air cleaner are magnetically attracted to each other.

10. An air induction system for an internal combustion engine, the air induction system comprising:

an air intake plenum that conducts intake airflow to an air cleaner for cleaning prior to combustion in the internal combustion engine, wherein the air intake plenum is movable with respect to the air cleaner between an open position separated from the air cleaner and a closed position connected to the air cleaner;

a bellows that connects the air intake plenum to the air cleaner when the air intake plenum is in the closed position, the bellows having an upstream first end that seals with the air intake plenum and a downstream second end that seals with the air cleaner; and a spring disposed in the bellows, wherein the spring applies a biasing pressure on the bellows that encourages sealing between the bellows and at least one of the air intake plenum and the air cleaner when the air intake plenum is in the closed position;

wherein the spring has opposite first and second ends and wherein at least one of the first and second ends is engaged in a groove on the bellows.

11. An air induction system for an internal combustion engine, the air induction system comprising:

an air intake plenum that conducts intake airflow to an air cleaner for cleaning prior to combustion in the internal combustion engine, wherein the air intake plenum is movable with respect to the air cleaner between an open position separated from the air cleaner and a closed position connected to the air cleaner;

a bellows that connects the air intake plenum to the air cleaner when the air intake plenum is in the closed position, the bellows having an upstream first end that seals with the air intake plenum and a downstream second end that seals with the air cleaner;

a spring disposed in the bellows, wherein the spring applies a biasing pressure on the bellows that encourages sealing between the bellows and at least one of the air intake plenum and the air cleaner when the air intake plenum is in the closed position; and a shield that covers the first end of the bellows, wherein the shield covers the first end of the bellows to a greater degree when the air intake plenum is in the open position than when the air intake plenum is in the closed position.

12. An air induction system for an internal combustion engine, the air induction system comprising:

an air intake plenum that conducts intake airflow to an air cleaner for cleaning prior to combustion in the internal combustion engine, wherein the air intake plenum is movable with respect to the air cleaner between an open position separated from the air cleaner and a closed position connected to the air cleaner;

a bellows that connects the air intake plenum to the air cleaner when the air intake plenum is in the closed position, the bellows having an upstream first end that seals with the air intake plenum and a downstream second end that seals with the air cleaner;

a spring disposed in the bellows, wherein the spring applies a biasing pressure on the bellows that encourages sealing between the bellows and at least one of the air intake plenum and the air cleaner when the air intake plenum is in the closed position; and a shield that blocks inflow of rain water to the bellows when the air intake plenum is in the open position;

wherein the shield also blocks inflow of rain water to the bellows when the air intake plenum is in the closed position, and wherein the shield blocks inflow of rain water to the bellows to a greater degree when the air intake plenum is in the open position than when the air intake plenum is in the closed position.

13. The air induction system according to claim 12, wherein the bellows is forced into a compressed state when the air intake plenum is in the closed position and wherein the bellows is biased into an extended state when the air intake plenum is in the open position, and wherein the shield remains stationary as the air intake plenum moves between the open and closed positions.

14. The air induction system according to claim 13, wherein the bellows is axially elongated and has an interior channel extending between a first opening at the first end and a second opening at the second end; and wherein shield comprises an axial support member that axially extends along the interior channel and a radial cover plate that radially extends from the axial support member.

15. The air induction system according to claim 14, wherein the axial support member comprises a center post that has at least one throughhole that allows intake airflow therethrough.

16. The air induction system according to claim 15, comprising a plurality of radially extending ribs that support the center post in the interior channel.

17. The air induction system according to claim 14, wherein the radial cover plate has a radially outer edge that is located adjacent an inner perimeteral surface of the bellows when the air intake plenum is in the open position.

18. The air induction system according to claim 17, wherein radially outer edge is axially flush with the first opening at the first end of the bellows when the air intake plenum is in the open position.

19. The air induction system according to claim 17, wherein the radially outer edge is axially spaced apart from the first end of the bellows when the air intake plenum is in the closed position so as to axially define a first perimeteral gap through which intake airflow passes to the air cleaner.

20. The air induction system according to claim 17, comprising a drain valve in the bellows, the drain valve draining rain water that enters the bellows via the first perimeteral gap.

21. The air induction system according to claim 17, wherein the radially outer edge seals with the bellows when the air intake plenum is in the closed position and wherein the radially outer edge is axially spaced apart from the first end of the bellows when the air intake plenum is in the closed position so as to axially define a first perimeteral gap through which intake airflow passes to the air cleaner.

22. The air induction system according to claim 21, wherein radial outer edge comprises a bottom portion that seals with the bellows when the air intake plenum is in the closed position.

23. The air induction system according to claim 21, comprising a radial extension plate that is axially spaced apart from the radial cover plate so as to axially define a second perimeteral gap therebetween that is axially spaced apart from the first perimeteral gap, wherein the second perimeteral gap continuously allows intake airflow into the bellows when the air intake plenum is in the open and closed positions.

24. The air induction system according to claim 23, comprising an axial extension member that supports the radial extension plate apart from the radial cover plate.

25. The air induction system according to claim 24, wherein the axial extension member comprises a center post that has at least one throughhole that allows intake airflow therethrough.

26. An air induction system for an internal combustion engine, the air induction system comprising:

an air intake plenum that conducts intake airflow to an air cleaner for cleaning prior to combustion in the internal combustion engine, wherein the air intake plenum is movable with respect to the air cleaner between an open position separated from the air cleaner and a closed position connected to the air cleaner;

a bellows that connects the air intake plenum to the air cleaner when the air intake plenum is in the closed position, the bellows having an upstream first end that seals with the air intake plenum and a downstream second end that seals with the air cleaner; and a shield that blocks inflow of rain water to the bellows when the air intake plenum is in the open position, the shield including an axial support member that axially extends along an interior channel, a radial cover plate, and a radial extension plate axially spaced apart from a radial cover plate so as to define a perimeteral gap therebetween that continuously allows intake air to pass into the bellows.

27. The air induction system according to claim 26, wherein when the air intake plenum is in the closed position the bellows moves into a compressed state and wherein when the air intake plenum is in the open position the bellows moves into an extended state; and wherein a first cross sectional area for intake airflow to the bellows is defined in the compressed state, and a second cross sectional area for intake airflow to the bellows is defined in the extended state.

28. The air induction system according to claim 26, wherein the shield covers the first end of the bellows, and wherein the shield covers the first end of the bellows to a greater degree when the air intake plenum is in the open position than when the air intake plenum is in the closed position.

29. The air induction system according to claim 28, wherein when the air intake plenum is in the closed position the bellows is forced into a compressed state and wherein when the air intake plenum is in the open position the bellows moves into an extended state; and wherein the shield remains stationary as the air intake plenum moves between the open and closed positions.

30. The air induction system according to claim 29, wherein the bellows is elongated and has the interior channel extending between a first opening at the first end and a second opening the second end; and wherein the radial cover plate radially extends from the axial support member.

31. The air induction system according to claim 30, wherein the axial support member comprises a center post that has at least one throughhole that allows intake airflow therethrough.

32. The air induction system according to claim 31, comprising a plurality of radially extending ribs that support the center post in the interior channel.

33. The air induction system according to claim 30, wherein the radial cover plate has a radially outer edge that is located adjacent an inner perimeteral surface of the bellows when the air intake plenum is in the open position.

34. The air induction system according to claim 33, wherein radially outer edge is axially flush with the first opening at the first end of the bellows when the air intake plenum is in the open position.

35. The air induction system according to claim 33, wherein the radially outer edge is axially spaced apart from the first end of the bellows when the air intake plenum is in the closed position so as to define a first perimeteral gap through which intake airflow passes to the air cleaner.

36. The air induction system according to claim 33, comprising a drain valve in the bellows, the drain valve draining rain water that enters the bellows via the first perimeteral gap.

37. The air induction system according to claim 33, wherein the radially outer edge seals with the bellows when the air intake plenum is in the closed position and wherein the radially outer edge is axially spaced apart from the first end of the bellows when the air intake plenum is in the closed position so as to define a first perimeteral gap through which intake airflow passes to the air cleaner.

38. The air induction system according to claim 37, wherein radial outer edge comprises a bottom portion that seals with the bellows when the air intake plenum is in the closed position.

39. The air induction system according to claim 38, comprising a radial extension plate that is axially spaced apart from the radial cover plate so as to define a second perimeteral gap therebetween that is axially spaced apart from the first perimeteral gap, wherein the second perimeteral gap continuously allows intake airflow into the bellows when the air intake plenum is moved between the open and closed positions.

40. The air induction system according to claim 39, comprising an axial extension member that supports the radial extension plate apart from the radial cover plate.

41. The air induction system according to claim 40, wherein the axial extension member comprises a center post that has at least one throughhole that allows intake airflow therethrough.

* * * * *